United States Patent
Weiss et al.

(10) Patent No.: US 11,614,041 B2
(45) Date of Patent: Mar. 28, 2023

(54) ENGINE INTAKE AIR AND EXHAUST CONTROL SYSTEM

(71) Applicant: Caterpillar Inc., Peoria, IL (US)

(72) Inventors: Kevin Weiss, Peoria, IL (US); Adam Zuk, Dunlap, IL (US); Ryan C. Eveler, Peoria, IL (US); Timothy A. Bazyn, Chillicothe, IL (US); Sylvain J. Charbonnel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/345,370

(22) Filed: Jun. 11, 2021

(65) Prior Publication Data
US 2022/0397070 A1    Dec. 15, 2022

(51) Int. Cl.
| | |
|---|---|
| F02D 41/00 | (2006.01) |
| F02D 41/14 | (2006.01) |
| F02B 37/24 | (2006.01) |
| F02B 37/12 | (2006.01) |

(52) U.S. Cl.
CPC .......... *F02D 41/0077* (2013.01); *F02B 37/24* (2013.01); *F02D 41/0052* (2013.01); *F02D 41/1401* (2013.01); *F02B 2037/125* (2013.01); *F02D 2041/1412* (2013.01); *F02D 2041/1437* (2013.01)

(58) Field of Classification Search
CPC ........ F02M 26/05; F02M 26/06; F02B 39/10; F02D 41/0052; F02D 41/0072; F02D 41/0007; F02D 2041/0075; F05D 2250/90
See application file for complete search history.

(56) References Cited

U.S. PATENT DOCUMENTS

| | | |
|---|---|---|
| 6,715,287 B1 | 4/2004 | Engel et al. |
| 7,089,738 B1 * | 8/2006 | Boewe ............... F02M 26/48 |
| | | 123/568.21 |
| 8,191,369 B2 | 6/2012 | Geyer et al. |
| (Continued) | | |

OTHER PUBLICATIONS

Dariusz Cieslar: "Control for Transient Response of Turbocharged Engines Acknowledgements", Diss. University of Cambridge, Mar. 1, 2013 (Mar. 1, 2013), pp. 1-211, XP055378247, Retrieved from the Internet: URL:https://www.google.nl/url?sa=t&rct=j&q=&esrc=s&source=web&cd=1&ved=0ahUKEwicnOXx3p7UAhXMK1AKHUhzDMMQFgguMAA&url=https://www.repository.cam.ac.uk/bitstream/handle/1810/244951/DC_thesis_hbd.pdf?.

(Continued)

*Primary Examiner* — John Kwon
(74) *Attorney, Agent, or Firm* — Bookoff McAndrews, PLLC

(57) ABSTRACT

In one aspect, a method for controlling an internal combustion engine system including an exhaust gas recirculation (EGR) valve and a variable-geometry turbocharger (VGT) having a compressor and a turbine includes receiving a plurality of requests for the internal combustion engine system. The method also includes predicting a plurality of expected states of the internal combustion engine system based on the plurality of requests and generating sets of candidate control points for actuating the EGR valve and the VGT based on the plurality of expected states. The method further includes selecting a set of candidate control points that avoids a surge condition of the compressor and based on the selected set of candidate control points, generating commands for actuating the EGR valve and the VGT.

20 Claims, 3 Drawing Sheets

(56) References Cited

U.S. PATENT DOCUMENTS

| 9,169,788 | B2 | 10/2015 | Smith et al. |
| 2007/0074512 | A1 | 4/2007 | Evers |
| 2019/0277188 | A1* | 9/2019 | Zeng .................. F02B 37/14 |
| 2020/0240424 | A1 | 7/2020 | Vijayakumar et al. |

OTHER PUBLICATIONS

Johan Wahlstrom et al: "Output Selection and Its Implications for MPC of EGR and VGT in Diesel Engines", IEEE Transactions on Control Systems Technology, IEEE Service Center, New York, NY, US, vol. 21, No. 3, May 1, 2013 (May 1, 2013), pp. 932-940, XP011504758, ISSN: 1063-6536, DOI: 10.1109/TCST.2012.2191289.

Zhou Junqiang et al: "Coordinated Performance Optimization of a Variable Geometry Compressor With Model Predictive Control for a Turbocharged Diesel Engine", IEEE Transactions on Control Systems Technology, IEEE Service Center, New York, NY, US, vol. 24, No. 3, May 1, 2016 (May 1, 2016), pp. 804-816, XP011607239, ISSN: 1063-6536, DOI: 10.1109/TCST.2015.2468085 [retrieved on Apr. 18, 2016].

Written Opinion and International Search Report for Int'l. Patent Appln. No. PCT/US2022/030614, dated Sep. 13, 2022 (14 pgs).

* cited by examiner

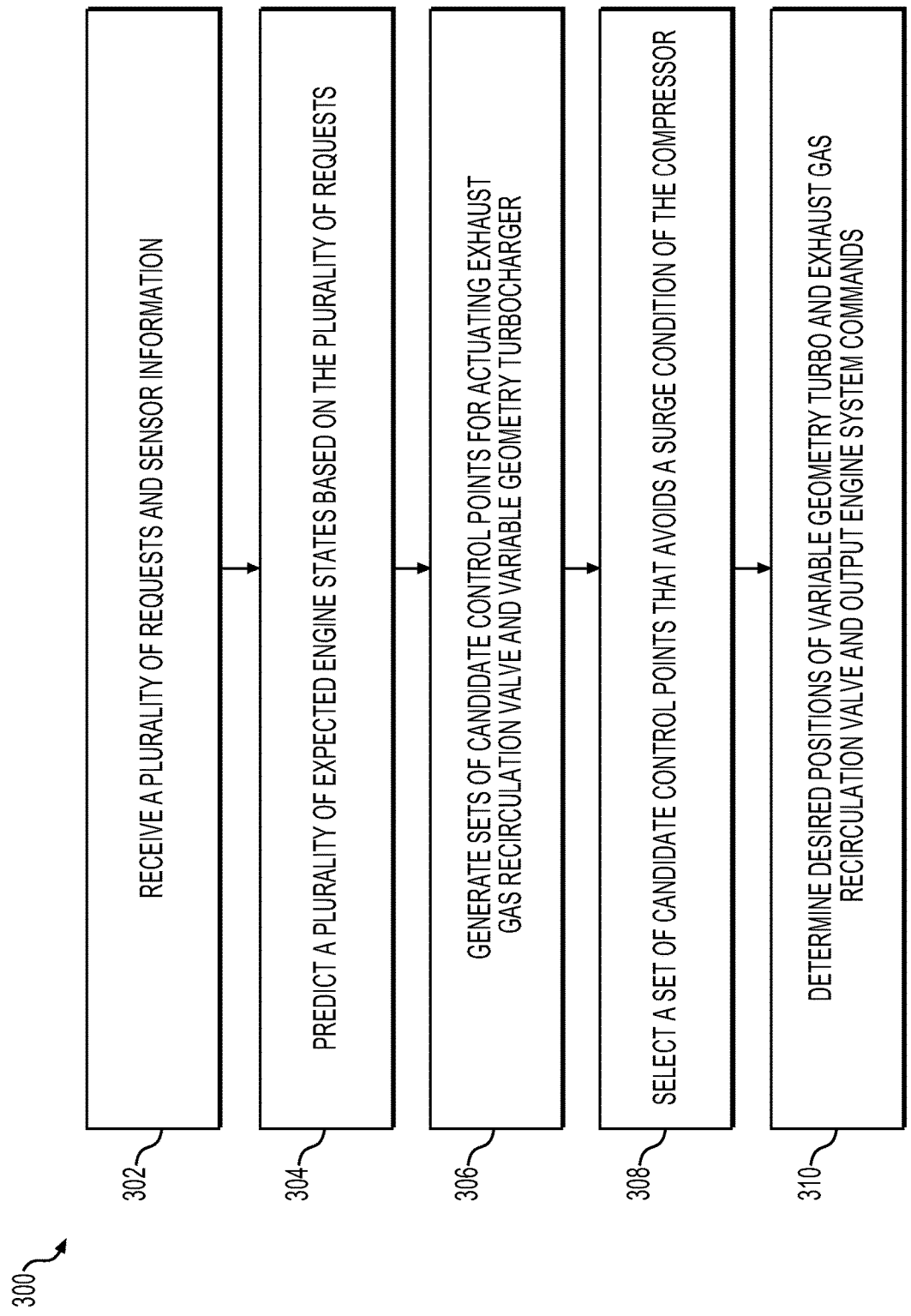

ENGINE INTAKE AIR AND EXHAUST CONTROL SYSTEM

TECHNICAL FIELD

The present disclosure relates generally to internal combustion engines, and more particularly, to an engine intake air and exhaust control system of internal combustion engines.

BACKGROUND

Internal combustion engines are used in vehicles, mobile machines, and stationary machines to perform work or generate power by the combustion of a fuel, such as diesel fuel. Internal combustion engines include multiple systems such as intake air systems, fuel delivery systems, exhaust systems, and others, that are controlled to improve engine efficiency, reduce the quantity of harmful emissions, improve engine response, and otherwise perform in a desired manner. However, operation of such engines under certain conditions may cause relatively low mass flow rate of air in a compressor of a turbocharger of the engine while at the same time a relatively high pressure ratio (e.g., a ratio of pressure at the exit of the compressor to pressure at the inlet of the compressor) across the compressor. Such an operation of the compressor can cause a surge condition in the compressor. For example, the surge condition causes the air flow to separate from the suction side of the blades of the compressor, resulting in reduced efficiency of the compressor and overall reduced energy output from the turbocharger.

Typically, these systems are controlled with control units that associate a single output with a corresponding input. These so-called "SISO" (single input single output)-based control units are helpful in relatively simple systems, but are less effective for complex systems, especially for systems including actuators that interact with each other, such as components involved with the flow of air and exhaust, such as a variable-geometry turbine and exhaust gas recirculation valve of an internal combustion engine. A change in position of one of these actuators affects the operation of the others, and thus can alter the performance of the system as a whole in an unintended manner. As one example, a change in the position of a variable-geometry turbine can affect intake air pressure, which in turn impacts flow rate of exhaust gas. Thus, a particular position of the variable-geometry turbine can affect the optimal position of an exhaust gas recirculation valve, making independent control of these components to avoid the surge condition (e.g., by individual control maps) undesirable.

U.S. Patent Application Publication No. 2007/0074512 ("the '512 publication"), published to Evers on Apr. 5, 2007, discloses an internal combustion engine includes a block defining at least one combustion cylinder. The engine of the '512 publication also includes an exhaust gas recirculation system and a turbocharger having a variable geometry turbocharger. The variable geometry turbocharger is movable to a first position effecting fluid flow of exhaust gas from the exhaust manifold to the intake manifold. The variable geometry turbocharger is movable to a second position effecting fluid flow of charge air to the variable geometry turbine, such as providing a reverse flow from the charge air fluid line to the fluid line leading to the variable geometry turbine. The system of the '512 publication utilizes the reverse flow mode when no exhaust gas recirculation flow is desired to maintain a positive engine delta pressure. However, the '512 publication may not account for coordinated control between the various components. Further, the system of the '512 may not enable optimal operation of the engine for fuel consumption and power density while avoiding the surge condition.

The disclosed methods and systems may solve one or more of the problems set forth above and/or other problems in the art. The scope of the current disclosure, however, is defined by the attached claims, and not by the ability to solve any specific problem.

SUMMARY

In one aspect, a method for controlling an internal combustion engine system including an exhaust gas recirculation (EGR) valve and a variable-geometry turbocharger (VGT) having a compressor and a turbine may include receiving a plurality of requests for the internal combustion engine system. The method may also include predicting a plurality of expected states of the internal combustion engine system based on the plurality of requests and generating sets of candidate control points for actuating the EGR valve and the VGT based on the plurality of expected states. The method may further include selecting a set of candidate control points that avoids a surge condition of the compressor and based on the selected set of candidate control points, generating commands for actuating the EGR valve and the VGT.

In another aspect, a control system for an internal combustion engine system may include an exhaust gas recirculation (EGR) valve, a variable-geometry turbocharger (VGT) including a compressor and a turbine, and a controller. The controller may be configured to: receive a plurality of requests for the internal combustion engine system and predict a plurality of expected states of the internal combustion engine system based on the plurality of requests. The controller may also be configured to generate sets of candidate control points for actuating the EGR valve and the VGT based on the plurality of expected states. The controller may further be configured to select a set of candidate control points that avoids a surge condition of the compressor and based on the selected set of candidate control points, generate commands for actuating the EGR valve and the VGT.

In yet another aspect, a method for controlling an internal combustion engine system including an exhaust gas recirculation (EGR) valve and a variable-geometry turbocharger (VGT) having a compressor and a turbine may include receiving a plurality of requests for the internal combustion engine system. At least one of the plurality of requests may include a request for reverse flow across the EGR valve. The method may also include predicting a plurality of expected states of the internal combustion engine system based on the plurality of requests using a model of the internal combustion system and generating sets of candidate control points for actuating the EGR valve and the VGT based on the plurality of expected states. The method may further include selecting a set of candidate control points that avoids a surge condition of the compressor and based on the selected set of candidate control points, generating commands for actuating the EGR valve and the VGT. The method may also include controlling the EGR valve and the VGT based on the generated commands to generate the reverse flow across the EGR valve.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 provides a flowchart depicting an exemplary method for controlling an internal combustion engine system for the engine of FIG. 1.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
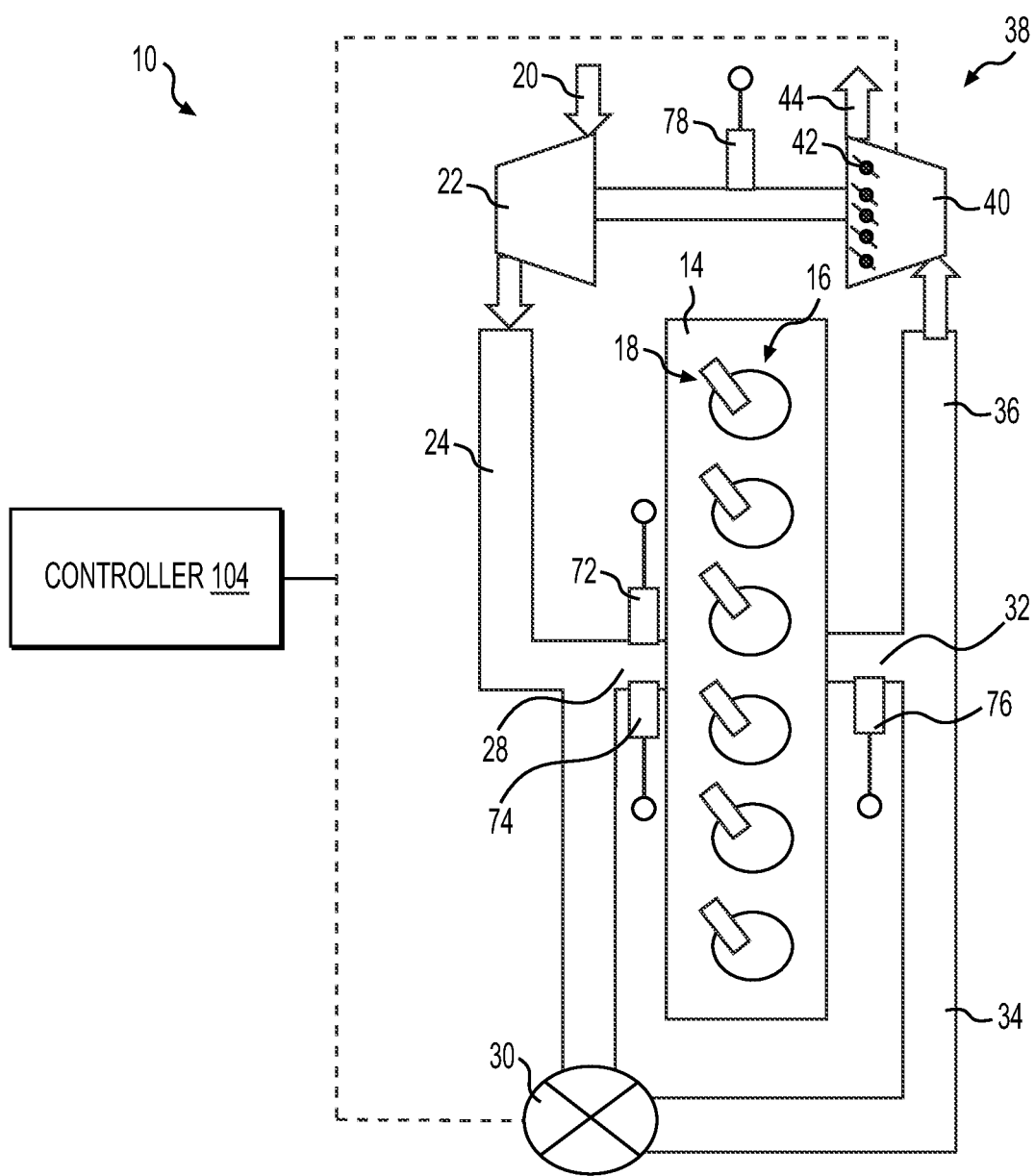
FIG. 1 is a schematic view of an engine including an intake air and exhaust control system, according to aspects of the present disclosure.

FIG. 1 illustrates an exemplary engine intake air and exhaust control system 10 for controlling components of intake air and exhaust systems used with an internal combustion engine 14. Engine intake air and exhaust control system 10 may include an intake air introduction system for supplying intake air to engine 14, an exhaust system for recirculating exhaust and allowing exhaust to exit system 10, and a controller 104, such as an engine control module (ECM). It is understood that controller 104 may embody one or more controllers and/or may be in communication with one or more separate controllers for controlling aspects of system 10, such as a combustion controller for determining desirable values for controlling combustion in engine 14, and one or more actuator controllers (e.g., PID controllers) configured to generate commands to actuators of system 10.

Internal combustion engine 14 may include a plurality of cylinders 16 that each receive fuel (e.g., diesel fuel) from a respective fuel injector 18. While engine 14 may be configured to combust diesel fuel, engine 14 may be configured to combust diesel fuel, gasoline, and/or gaseous fuel such as natural gas, either alone or in a dual fuel system that also combusts diesel fuel.

The intake air introduction system of control system 10 that supplies intake air to engine 14 may include an air intake 20 which supplies fresh air to an inlet of a compressor 22 of a variable-geometry turbocharger (VGT) 38. An air passage 24 may extend downstream of compressor 22 to supply compressed air to an intake manifold 28. While not shown in FIG. 1, intake manifold 28 may branch into individual paths to a plurality of cylinders 16 of internal combustion engine 14. Further, a valve, such as an intake throttle valve (not shown), may be disposed in air passage 24 between compressor 22 and intake manifold 28 for controlling an amount and/or a pressure of air provided to the intake manifold 28.

The exhaust system may include an exhaust manifold 32 having separate branches (not shown) for each cylinder 16 which are connected downstream of engine 14 to receive exhaust gas produced by the combustion of fuel in cylinders 16. An exhaust gas recirculation (EGR) passage 34 may allow a portion of this exhaust to return to intake manifold 28, based on the position of an EGR valve 30. An exhaust passage 36 may connect exhaust manifold 32 to an inlet of turbine 40 of VGT 38. Turbine 40 may include a plurality of positionable vanes 42 that control a pressure drop across turbine 40. Vanes 42 may be actuated in response to a control signal to modify a restriction to the flow of exhaust from an inlet of turbine 40 to an outlet of turbine 40. An exhaust passage 44 may be connected downstream of the outlet of turbine 40 to supply exhaust from turbine 40 to one or more aftertreatment devices (e.g., one or more filters and/or catalysts).

A sensor system of control system 10 may include one or more sensors for detecting a condition of air supplied via intake manifold 28, one or more sensors for detecting a condition of exhaust exiting engine 14 via exhaust manifold 32, and one or more sensors for detecting a condition of VGT 38. In an exemplary configuration, the sensor system may include an intake manifold pressure sensor 72 configured to detect intake manifold absolute pressure (IMAP) of air within intake manifold 28, and an intake manifold temperature sensor 74 configured to detect intake manifold absolute temperature (IMAT) associated with intake manifold 28. The sensor system may also include an exhaust manifold pressure sensor 76 configured to detect an exhaust manifold absolute pressure (EMAP) within exhaust manifold 32, and a turbine speed sensor 78 may be configured to detect a speed at which turbine 40 rotates (e.g., by detecting rotation of a shaft connected to turbine 40). Further, sensor system may include physical sensors and/or virtual sensors (e.g., sensors that determine a value indirectly by controller 104 based on other sensed values) and may include any number and/or combination of sensors as necessary for sensing or measuring operating conditions.

Figure 2:
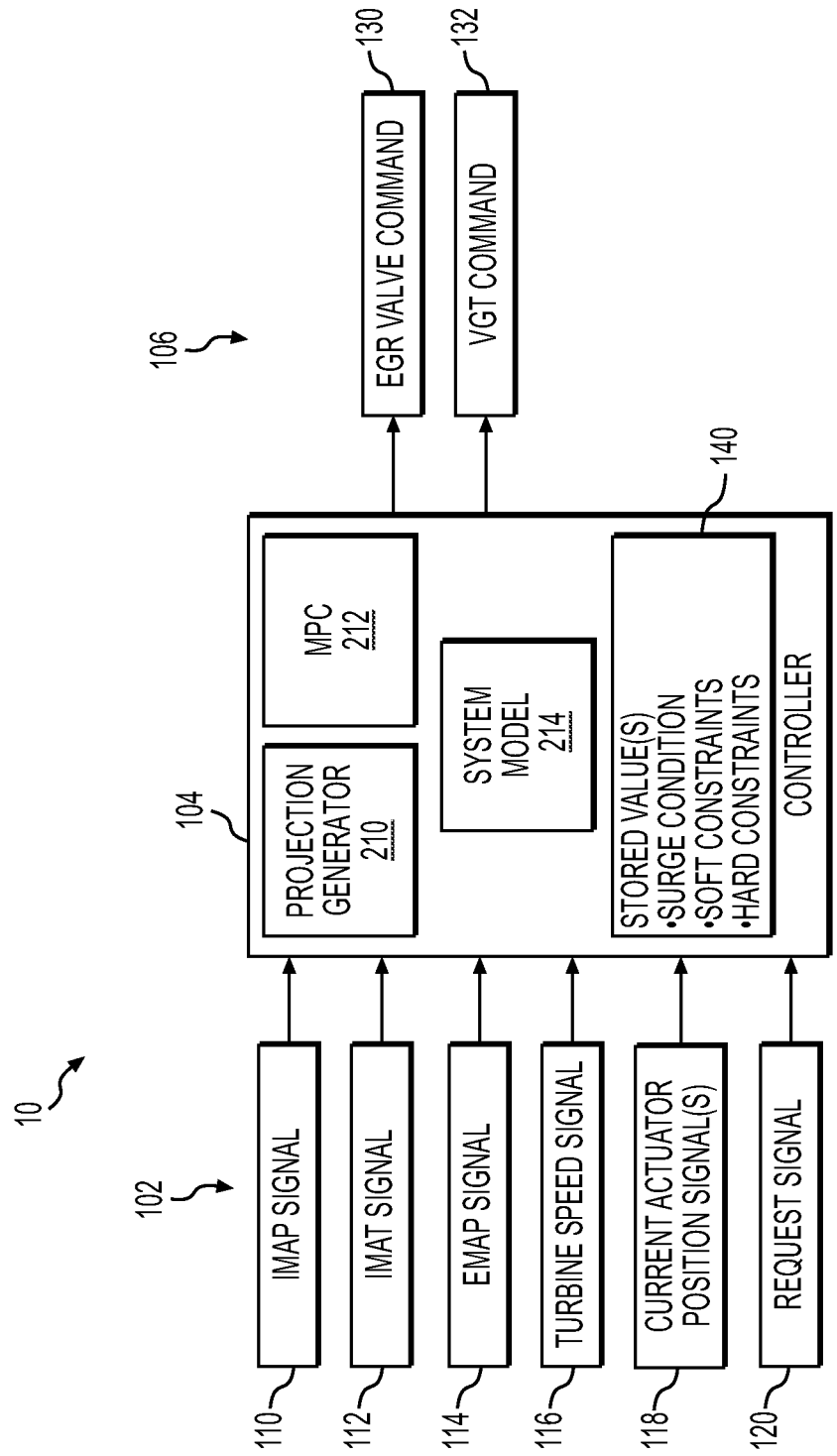
FIG. 2 is a schematic of an exemplary engine intake air and exhaust system control system for the engine of FIG. 1.

FIG. 2 illustrates a schematic view of the exemplary engine intake air and exhaust control system 10 for operation and/or control of at least portions of engine 14. As shown in FIG. 2, control system 10 may include inputs 102, controller 104, and outputs 106. Inputs 102 may include, for example, an intake manifold absolute pressure (IMAP) signal 110 generated by intake manifold pressure sensor 72, an intake manifold air temperature (IMAT) signal 112 generated by intake manifold temperature sensor 74, an exhaust manifold absolute pressure (EMAP) signal generated by exhaust manifold pressure sensor 76, a turbine speed signal 116 generated by turbine speed sensor 78. If desired, controller 104 may receive additional inputs 102 indicative of other aspects of engine 14, including current actuator position signals 118 from the EGR valve 30 and the VGT 38, and a request signal 120 from another controller (e.g., a combustion controller). Request signal 120 may also be generated by controller 104. Additional inputs 102 may also include a fuel flow rate, an engine speed, a condition of an aftertreatment system, and other appropriate information.

Outputs 106 may include, for example, an EGR valve command 130 and/or VGT command 132. Controller 104 may receive inputs 102, implement a method 300 for controlling the above-described components of engine air control system 10 and generate outputs 106, as described with reference to FIG. 3 below.

Controller 104 may embody a single microprocessor or multiple microprocessors that receive inputs 102 and generate outputs 106. For example, controller 104 may include a memory, a secondary storage device, and a processor, such as a central processing unit or any other means for accomplishing a task consistent with the present disclosure. The memory or secondary storage device associated with controller 104 may store data and/or software to allow controller 104 to perform its functions, such as the functions of method 300 of FIG. 3. Further, the memory or secondary storage device associated with controller 104 may also store data received from the various inputs 102. Numerous commercially available microprocessors can be configured to perform the functions of controller 104. Alternatively, a special-purpose machine controller could be provided. Further, controller 104, or portions thereof, may be located remote from engine 10. Various other known circuits may be associated with controller 104, including signal-conditioning circuitry, communication circuitry, and other appropriate circuitry.

Controller 104 may also include one or more components or modules, and may include stored or derived values 140. Components or modules of controller 104 may include projection generator 210, a model predictive controller (MPC) 212, a plant or system model 214, and/or a disturbance estimator. It is understood that components or modules of controller 104 may be combined to include fewer components or modules, separated to include additional components or modules, and/or may include other types of components or modules.

Stored or derived values 140 may include surge condition values, one or more soft constraints, and/or one or more hard constraints. As used herein, the "surge condition" is a condition of the compressor 22 that includes an instability boundary which denotes onsets of discernible flow instabilities, such as stalling of the air flow at the inlet of compressor 22. For example, when the mass air flow is relatively low and the pressure ratio is relatively high, the flow may separate from the suction side of the blades of the compressor 22. Accordingly, the stored surge condition values may include a map or lookup table that correlates various values of pressure ratio across the compressor 22 for various values of air mass flow that indicate the surge condition. The information used to derive the values of the map or lookup table may be determined by empirical analysis. Such empirical data may be obtained, for example, by operating a test engine 14 under predetermined conditions (e.g., under particular operating conditions) during, for example, bench testing. For example, the pressure ratio values may be correlated to the air mass flow values and define when the surge condition exists. While the exemplary embodiment details the pressure ratio as a function of air mass flow, it is understood that the map or lookup table may provide the surge condition based on other operating condition values. Also, rather than create and store a map or lookup table using discrete measured values, a suitable approximating mathematical equation could be employed instead.

The soft constraints and the hard constraints may include cost values use for evaluating various sets of candidate control points for generating commands 130, 132, as detailed further below. As used herein, a "soft constraint" corresponds to one or more performance values that are associated with a cost, but which are permitted for selection. A "hard constraint" corresponds to one or more performance values that are associated with a cost, but are not permitted for selection. The soft constraints and hard constraints may include predetermined values based on the surge condition. For example, the soft constraints may include a first set of values ranking a set of candidate control points based on how close within a first margin a predicted expected state of the compressor 22 is to the surge condition if the set of candidate control points is used to generate commands 130, 132. For example, controller 104 may select the set of candidate control points, as discussed below, if the predicted expected state of the compressor 22 is within 20% to the surge condition. The hard constraint may include a second set of values ranking a set of candidate control points based on how close within a second margin the predicted expected state of the compressor 22 is to the surge condition. For example, controller 104 may exclude, disregard, or otherwise not select, a set of candidate control points if the predicted expected state of the compressor 22 is within 10% or less to the surge condition.

Controller 104 may be configured for model predictive control of engine 14 and may be in communication with additional controllers of system 10 as shown in FIG. 1, or may be a unified controller that directly receives inputs 102 and generates commands 130 and 132 directly to one or more actuated components. Controller 104 may be programmed to implement a projection generator 210, an MPC 212, and a system model 214. Controller 104 may employ these functions to calculate desired positions of VGT 38 and EGR valve 30, for controlling components of system 10. For example, controller 104 may generate outputs 106, including commands 130, 132 for controlling a position of EGR valve 30 and for controlling a position of vanes 42 of VGT 38, respectively, via respective actuators. In some configurations, controller 104 may generate commands indicative of desired positions of VGT 38 and EGR valve 30 and a separate controller (e.g., an actuator controller) may generate the commands 130, 132 for controlling the vanes 42 and the EGR valve 30. Additionally, if desired, controller 104 may generate additional signals (not shown) for controlling other aspects of system 10 and/or engine 14, such as an amount of fuel delivered to cylinders 16 via fuel injectors 18, a timing of the injection of this fuel, a transmission system, a hydraulic system, etc.

Projection generator 210 may be configured to receive requests from an operator, from a separate controller (e.g., a combustion controller), and/or may generate requests directly. Requests may be generated based on desired operation of system 10. For example, an operator may desire to operate engine 14 in a certain manner, and the requests may be generated in response to the desired operation. These requests may include, for example, a requested IMAP (e.g., a requested pressure of air in intake manifold 28) and a requested EGR flow (e.g., in the form of a desired mass flow rate through EGR passage 34 and EGR valve 30 from exhaust manifold 32 to intake manifold 28 to return to cylinders 16). For example, the requested EGR flow may include a request for negative, or reverse, EGR flow if the measured engine state approaches the surge condition. As used herein, a "negative" or "reverse" EGR flow is a mass flow rate through EGR passage 34 and EGR valve 30 from intake manifold 28 to exhaust manifold 32. As detailed below, a negative EGR flow may help to prevent or otherwise reduce the likelihood of the surge condition.

Projection generator 210 may generate a trajectory projection as an output. For example, projection generator 210 may be configured to output a matrix indicative of expected future values of requests over a predetermined period of time or projection window. This projection window may correspond to a number of future steps which may represent points in time in the future. Future values of requests included in the trajectory projection may be determined based on the current values of these requests and, if desired, one or more previous values. Projection generator 210 may convert singular requests into the trajectory projection, which is indicative of a future behavior of requests (e.g., one or more future values of the requests) over a predetermined period of time that represents the length of the projection window.

Controller 104 may also be configured to convert sensor signals 110, 112, 114 and 116 to estimated conditions of components of system 10. Controller 104 may be configured to calculate measured states of system 10 that include, IMAP, EMAP, turbine speed, trapped mass (e.g., a mass of trapped air within one or more air intake components or cylinders 16 of engine 14, calculated based on the measured value of IMAT indicated by intake manifold temperature signal 112), flow rate of intake air through compressor 22, and flow rate of exhaust through EGR valve 30. IMAP may be determined based on intake manifold pressure signal 110. EMAP may be determined based on exhaust manifold pressure signal 114, while turbine speed may be determined based on turbine speed signal 116.

System model 214 may receive, as inputs, measured disturbances and current actuator positions (e.g., current positions of VGT 40 and EGR valve 30 in vector form). Measured disturbances may include measured and/or calculated values that correspond to external disturbances that affect performance of the intake air and exhaust systems of system 10. For example, measured disturbances may include engine speed detected by an engine speed sensor, an amount of fuel supplied by fuel injectors 18, a torque generated by engine 14, detected temperatures (e.g., ambient temperature, coolant temperature, etc.), and ambient air pressure (e.g., a barometric pressure). System model 214 may also receive, as feedback, estimated, or expected states output from system model 214 (e.g., the result of the previous calculation by system model 214), estimated disturbances (e.g., the result of the previous calculation of disturbances), and desired EGR and VGT positions as described below.

System model 214 may include a model of the intake air and exhaust systems associated with engine 14. System model 214 may include mathematical relationships for air intake 20, compressor 22, EGR components (EGR valve 30 and EGR passage 34), cylinders 16, exhaust manifold 32, turbine 40, and vanes 42, for example. System model 214 may model the interactions between these components, and may be configured to predict the overall effect of the positions of vanes 42 of VGT 38 and EGR valve 30 on the resulting IMAP, EGR flow, and other performance characteristics, such as fuel consumption and/or power density of engine 14. The model stored in system model 214 may be a linear or non-linear model stored in a memory of controller 104 and may be accessed by other modules of controller 104.

Controller 104 may use the calculated measured states (e.g., actual or measured values of IMAP, EMAP, turbine speed, trapped mass, flow rate of air through compressor 22, and flow rate of exhaust through EGR valve 30) and estimated states from system model 214 (e.g., values, estimated with system model 214, of IMAP, EMAP, turbine speed, trapped mass, flow rate of air through compressor 22, and flow rate of exhaust through EGR valve 30). Thus, the estimated states may include expected values that correspond to the values of the measured states. Controller 104 may compare the measured states and estimated states 220 to determine an amount of deviation between the two. This comparison may be performed with a Kalman filtering technique (linear, extended, or unscented), for example. Based on the deviation between the measured states and estimated states, controller 104 may be configured to calculate estimated disturbances. Estimated disturbances may be an estimation of internal disturbances that are not directly measured and which represent, for example, physical realities that are not reflected in system model 214. Estimated disturbances may be output with estimated states to MPC 212. These estimated internal disturbances may also be output as estimated disturbances and used to correct system model 214. While controller 104 may be configured to estimate internal disturbances that are not directly measured, a "disturbance" may also include an external disturbance measured via one or more sensors or otherwise calculated by controller 104, as described below with respect to measured disturbances.

MPC 212 may be a linear or non-linear model predictive controller including an optimizer configured to identify an optimal set of control points (e.g., as a control law) based on a performance index or cost function. In particular, MPC 212 may be programmed to evaluate potential sets of candidate control points corresponding to positions of EGR valve 30 and VGT 38, and output, for example, desired EGR and VGT positions.

In an exemplary configuration, MPC 212 is a model predictive controller that performs an optimization routine based on a linearized version of system model 214. Linearization of system model 214 (e.g., by a perturbation technique) may facilitate approximation of the behavior modeled by system model 214 and may be performed periodically (e.g., each time desired EGR, VGT positions are output and/or generated). This linearization may reduce the complexity of the optimizer's calculations, as described below, and therefore enables the optimizer to converge faster to an optimum control law within a particular period of time when compared to a non-linear MPC.

MPC 212 may receive, as inputs, the trajectory projection indicative of one or more future values of requests from projection generator 210, estimated disturbances, and estimated states. MPC 212 may also receive measured disturbances. Measured disturbances may include measured and/or calculated values that correspond to external disturbances that affect performance of the intake air and exhaust systems of system 10, and may be the same values as measured disturbances received by system model 214.

The optimizer may evaluate sets of candidate control points based on cost information stored with a cost function and select the set of candidate control points associated with the lowest cost. For example, the optimizer may determine performance values that correspond to each set of candidate control points. Performance values may represent the expected performance of components of system 10 for a particular set of candidate control points. Each performance value may be calculated over an entirety of the projection window, enabling the determination of costs across the entire projection window. For example, one performance value may include expected IMAP values calculated over the projection window for a set of candidate control points.

In particular, exemplary performance values may include expected values of IMAP, EMAP, turbine speed, trapped mass, flow rate of air through compressor 22, flow rate of exhaust through EGR valve 30, and others. The deviation of these values from respective desired values may be programmed as a trajectory error or tracking error of the cost function. Performance values may also include an expected amount of change in positions VGT 38 and EGR valve 30 from current positions of these actuators, which may correspond to an actuator movement cost of the cost function. In some configurations, the cost function may associate a higher cost with large changes in the positions of these actuators. Additional costs of the cost function may include the soft constraints and/or hard constraints, as discussed above. Each cost may be calculated over an entirety of the projection window, such that the costs represent the total cost incurred across the projection window, as indicated above. Additionally, ending or terminal positions of VGT 38 and EGR valve 30 at the end of the projection window may also be included in the performance values, and may be associated with costs of the cost function.

In some configurations, the cost function of MPC 212 may be programmed with a plurality of soft constraints so that MPC 212 is free to select among sets of candidate control points for controlling VGT 38 and EGR valve 30 without considering any hard constraints. The use of soft constraints may ensure that the optimizer is able to identify an optimal set of candidate control points for each calculation cycle of controller 104, as described below. Thus, soft constraints employed by an MPC may be suitable for controlling the positions of components that interact with each other, such as VGT 38 and EGR valve 30, and may avoid complex analyses which can result in selection of a sub-optimal set of candidate control points to avoid a particular hard constraint.

MPC 212, via the optimizer, may conduct a search for appropriate sets of candidate control points, and may be programmed with one or more search strategies, as algorithms, to facilitate the identification of suitable sets of candidate control points having a minimal cost. In some embodiments, the search strategy may be targeted, based on one or more previously-identified sets of candidate control points, such as the most favorable set of candidate control points identified by MPC 212. MPC 212 may be configured to perform a random or semi-random search (e.g., via a Latin Hyper Cube algorithm, Particle Swarm technique, or similar techniques) in order to identify candidate control points that would not likely be identified by performing a targeted search. Suitable targeted search strategies may be based on matrix inversion, gradient search (e.g., conjugate gradient, steepest descent, Broyden-Fletcher-Goldfarb-Shanno (BFGS), or first rank), dynamic differential programming, or a hybrid technique (e.g., a random or semi-random search followed by a gradient search). In some aspects, MPC 212 may be configured to perform a plurality of search strategies in parallel. Search strategies that may be performed in parallel may include a random search, a grid-based search, matrix inversion searching, or others. The results of the parallel searches may be compared such that the most optimal set of candidate control points is selected from among the different searches.

INDUSTRIAL APPLICABILITY

The disclosed aspects of engine intake air control system 10 may be employed in a variety of engines, and machines and/or vehicles that incorporate these engines to generate power to move the machine, power an implement, generate electrical energy, etc. Control system 10 may be included in any machine having an internal combustion engine that includes intake air and exhaust systems, and in particular, an intake air and exhaust system including an EGR valve and a VGT.

During the operation of engine intake air and exhaust control system 10, engine 14 combusts fuel injected by fuel injectors 18 to cylinders 16. Controller 104 may receive, and/or generate, requests (e.g., request signals 120), including desired intake airflow and exhaust commands, as described above, and may generate signals indicative of desired EGR and VGT positions (e.g., to one or more actuator controllers) for actuation of EGR valve 30 and VGT 38. The signals of desired EGR and VGT positions may be generated with a linear MPC 212 that is configured to predict requests over a projection window based on current and previous requests, to evaluate the desirability of various sets of candidate control points for the intake air and exhaust components connected to engine 14. Under certain conditions of system 10, a surge condition of the compressor 22 may exist, as detailed above. For example, control of the components of system 10 may cause relatively low mass flow rate of air in the compressor 22 while at the same time a relatively high pressure ratio across the compressor 22. The surge condition may cause decreased efficiency of the compressor 22 such that the effectiveness of the compressor 22 is reduced and energy output of the turbocharger is reduced. Accordingly, as detailed below with respect to FIG. 3, controller 104 may evaluate and select sets of candidate control points for the intake air and exhaust components that avoid the surge condition.

FIG. 3 is a flowchart illustrating an exemplary method 300 for controlling an internal combustion engine system, such as engine intake air and exhaust control system 10, including a VGT 38 and EGR valve 30. Method 300 may include a step 302 for receiving a plurality of requests and sensor information for operation of engine 14. Requests received in step 302 may include a request generated by controller 104 and/or may be generated from a higher-level controller, such as a combustion controller, in communication with controller 104, as described above. In particular, requests may include a requested IMAP and/or a requested EGR flow. The received sensor information in step 302 may be from the sensor system associated with system 10, including signals 110, 112, 114, and 116. Step 302 may include receiving or calculating additional requests or sensor information for engine 14, including engine speed, quantity or mass of injected fuel, temperatures of system 10, and others. Controller 104 may also determine one or more future desired requests. These future requests may correspond to future values of the requests received in step 302. For example, controller 104 may determine a projection for requests, as described above with respect to projection generator 210. This projection may include constant values, values that approach a particular setpoint (e.g., via an exponential decay function or a funnel-based algorithm), or values that fluctuate over time. The projection may be based on current values of requests, as well as historical values of these requests.

Step 304 may include predicting a plurality of expected engine states with system model 214 based on the plurality of requests. These states may correspond to a current status of the operating conditions of engine 14 and the intake air and exhaust systems for engine 14, which are output from system model 214 as estimated states. The predicted engine states, output as estimated states, may correspond to conditions simulated with system model 214 based on current actuator positions (e.g., positions of VGT 38 and EGR 30) and measured disturbances such as engine speed, an amount of injected fuel, engine torque, ambient temperature, coolant temperature, or ambient air pressure. Exemplary estimated engine states may include values of IMAP, EMAP, turbine speed, and trapped air mass.

Step 306 may include generating sets of candidate control points for actuating EGR valve 30 and VGT 38. For example, controller 104 may determine desired positions of VGT 38 and EGR 30 with use of an MPC 212, as detailed above. In one example, a set of candidate control points may be calculated by performing the steps of method 300, including step 306, about every 10 ms. To ensure sufficient accuracy in the evaluation of sets of candidate control points according to cost function 240, each projection window may extend for a desired number of steps (e.g., 1 step, 5 steps, 10 steps, 20 steps, 50 steps, etc.), and may cover 1000 ms or other suitable periods of time, based on the requirements of system 10.

Step 308 may include selecting a set of candidate control points that avoids a surge condition of the compressor 22. For example, MPC 212 may evaluate the sets of candidate control points for sets that result in an expected state of system 10 avoiding the surge condition. This may be performed by identifying an optimal set of candidate control points with an optimizer, as detailed above. The optimal set of candidate control points may be determined by using a cost function to evaluate costs associated with each set of candidate control points over an entirety of the projection window. Step 308 may be performed with the cost function that includes a plurality of soft constraints and/or hard constraints, as detailed above, to ensure an optimal set of control points that avoids the surge condition is identified. Step 308 may further include evaluating costs (e.g., in a cost function) that are correlated with terminal positions of VGT 38 and EGR valve 30, as well as the evaluation of costs associated with changing the positions of VGT 38 and EGR valve 30, to facilitate selection of desired positions that are the most optimal control points for operating engine 14 while avoiding the surge condition.

Step 310 may include determining and outputting desired positions as one or more commands 130, 132 for controlling VGT 38 and EGR valve 30 based on the selected set of candidate control points. Alternatively, this may be performed by outputting positions as a command 130, 132 to one or more actuator controllers (e.g., a PID controller). The commands 130, 132 for controlling VGT 38 and EGR valve 30 may include controlling VGT 38 and EGR valve 30 such that EGR flow is negative (e.g., flow through EGR valve 30 from the intake manifold 28 to the exhaust manifold 32), as detailed above, in order to avoid the surge condition. For example, the negative EGR flow (e.g., −100 kg/hr) may provide an increased mass flow rate to the compressor 22 by flowing additional air to the compressor 22 from the intake manifold 28 (e.g., rather than the entirety of the air through cylinders 16). Therefore, controlling VGT 38 and EGR valve 30 in such away may increase mass air flow through the compressor 22 and may prevent the surge condition.

The system and method of the present disclosure may facilitate control of an engine system including air and exhaust components that interact with each other, such as variable-geometry turbocharger and exhaust gas recirculation valve. The disclosed system and method may facilitate a reduction in an amount of engine testing required during initial programming for calibration of an engine controller. Optimal control of intake air and exhaust systems by modeling a variable-geometry turbocharger and exhaust gas recirculation valve may improve fuel consumption of engine 14, while also avoiding a surge condition and allowing for an increase in power density as the system may, in some circumstances operate closer to system limits. A model-based control system for intake air and exhaust systems may avoid the need to incorporate logic to switch between different modes (e.g., a separate mode for avoiding the surge condition), or the need to prepare specialized programming for use in specific situations. For example, the disclosed system and method may allow for coordinated control of a variable-geometry turbocharger and exhaust gas recirculation valve, by taking into account the interactions between these components over time. Additionally, model-based control systems described herein may allow for an output (e.g., an optimal set of control points) to be identified for each step of controlling an engine, while avoiding the identification of only unfeasible sets control points, thereby increasing robustness of the control system.

It will be apparent to those skilled in the art that various modifications and variations can be made to the disclosed method and system without departing from the scope of the disclosure. Other embodiments of the method and system will be apparent to those skilled in the art from consideration of the specification and practice of the systems disclosed herein. It is intended that the specification and examples be considered as exemplary only, with a true scope of the disclosure being indicated by the following claims and their equivalents.

What is claimed is:

1. A method for controlling an internal combustion engine system including an exhaust gas recirculation (EGR) valve and a variable-geometry turbocharger (VGT) having a compressor and a turbine, the method comprising:
receiving a plurality of requests for the internal combustion engine system;
predicting a plurality of expected states of the internal combustion engine system based on the plurality of requests;
generating sets of candidate control points for actuating the EGR valve and the VGT based on the plurality of expected states;
identifying one or more sets of candidate control points, among the generated sets of candidate control points, that avoid a surge condition of the compressor;
evaluating the one or more identified sets of candidate control points that avoid the surge condition based on a cost function;
selecting the set of candidate control points with the lowest cost associated with the cost function; and
based on the selected set of candidate control points, generating commands for actuating the EGR valve and the VGT.

2. The method of claim 1, wherein evaluating the identified sets of candidate control points includes using a linearization technique, and predicting the plurality of expected states includes using a linearized model of the internal combustion engine system.

3. The method of claim 2, further including:
receiving sensor information including information indicative of a condition of air supplied to the internal combustion engine and a condition of exhaust exiting the internal combustion engine; and
simulating conditions of the internal combustion engine system with the linearized model based on the received sensor information.

4. The method of claim 3, further including simulating conditions of the internal combustion engine system with the linearized model based on current positions of the EGR valve and the VGT.

5. The method of claim 1, wherein identifying the sets of candidate control points is based on a soft constraint that defines if an expected state is within a first margin of the surge condition.

6. The method of claim 5, wherein evaluating the sets of candidate control points includes ranking the identified sets of candidate control points based on the soft constraint.

7. The method of claim 5, wherein identifying the sets of candidate control points includes excluding sets of candidate control points based on a hard constraint that defines if an expected state is within a second margin of the surge condition.

8. The method of claim 1, wherein at least one of the plurality of requests includes a request for reverse flow across the EGR valve, and the method further includes controlling the EGR valve and the VGT based on the generated commands to generate the reverse flow across the EGR valve.

9. The method of claim 8, wherein evaluating the identified sets of candidate control points that avoid the surge condition is further based on a performance index.

10. A control system for an internal combustion engine system, comprising:
an exhaust gas recirculation (EGR) valve;
a variable-geometry turbocharger (VGT) including a compressor and a turbine; and
a controller configured to:
receive a plurality of requests for the internal combustion engine system;
predict a plurality of expected states of the internal combustion engine system based on the plurality of requests;
generate sets of candidate control points for actuating the EGR valve and the VGT based on the plurality of expected states;
select a set of candidate control points that avoids a surge condition of the compressor; and
based on the selected set of candidate control points, generate commands for actuating the EGR valve and the VGT, wherein the controller is configured to predict the plurality of expected states and/or select the set of candidate control points using a linearized model, wherein the linearized model is configured to approximate a behavior of the internal combustion engine system.

11. The system of claim 10, wherein using the linearized model of the internal combustion engine system includes using a perturbation technique.

12. The system of claim 11, wherein the controller is further configured to:
receive sensor information including information indicative of a condition of air supplied to the internal combustion engine and a condition of exhaust exiting the internal combustion engine;
simulate conditions of the internal combustion engine system with the linearized model based on the received sensor information; and
simulate conditions of the internal combustion engine system with the linearized model based on current positions of the EGR valve and the VGT.

13. The system of claim 10, wherein the controller is further configured to use the linearized model to predict future requests over a projection window based on the received plurality of requests.

14. The system of claim 13, wherein the controller is further configured to:
select the set of candidate control points based on a soft constraint that defines if an expected state is within a first margin of the surge condition; and
rank the sets of candidate control points based on the soft constraint.

15. The system of claim 13, wherein the controller is further configured to exclude sets of candidate control points based on a hard constraint that defines if an expected state is within a second margin of the surge condition.

16. The system of claim 10, wherein at least one of the plurality of requests includes a request for reverse flow across the EGR valve.

17. The system of claim 16, wherein the controller is further configured to control the EGR valve and the VGT based on the generated commands to generate the reverse flow across the EGR valve.

18. A method for controlling an internal combustion engine system including an exhaust gas recirculation (EGR) valve and a variable-geometry turbocharger (VGT) having a compressor and a turbine, the method comprising:
receiving a plurality of requests for the internal combustion engine system, wherein at least one of the plurality of requests includes a request for reverse flow across the EGR valve;
predicting a plurality of expected states of the internal combustion engine system based on the plurality of requests using a model of the internal combustion system;
generating sets of candidate control points for actuating the EGR valve and the VGT based on the plurality of expected states;
selecting a set of candidate control points that avoids a surge condition of the compressor;
based on the selected set of candidate control points, generating commands for actuating the EGR valve and the VGT; and
controlling the EGR valve and the VGT based on the generated commands to generate the reverse flow across the EGR valve.

19. The method of claim 18, further including:
selecting the set of candidate control points based on a soft constraint that defines if an expected state is within a first margin of the surge condition; and
ranking the set of candidate control points based on the soft constraint.

20. The method of claim 1, wherein the cost function corresponds to a change in position of the EGR valve and/or the VGT, and the lowest cost includes a smallest change in position.

* * * * *